(12) United States Patent
Lu

(10) Patent No.: US 11,817,811 B2
(45) Date of Patent: Nov. 14, 2023

(54) MOTOR CONTROLLER WITH POWER FEEDBACK LOOP

(71) Applicant: Allegro MicroSystems, LLC, Manchester, NH (US)

(72) Inventor: Yisong Lu, Shrewsbury, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 137 days.

(21) Appl. No.: 16/299,293

(22) Filed: Mar. 12, 2019

(65) Prior Publication Data

US 2020/0295682 A1 Sep. 17, 2020

(51) Int. Cl.
*H02P 6/15* (2016.01)
*H02P 21/24* (2016.01)
*H02P 7/29* (2016.01)

(52) U.S. Cl.
CPC ........ *H02P 7/2913* (2013.01); *H02P 2205/03* (2013.01); *H02P 2205/07* (2013.01)

(58) Field of Classification Search
CPC ........... B60L 50/51; H02P 27/08; H02P 23/26
See application file for complete search history.

(56) References Cited

U.S. PATENT DOCUMENTS

| | | | |
|---|---|---|---|
| 5,847,520 A | 12/1998 | Theurillat et al. | |
| 7,590,334 B2 | 9/2009 | Yabusaki et al. | |
| 7,747,146 B2 | 6/2010 | Milano et al. | |
| 8,729,841 B2 | 5/2014 | Reynolds et al. | |
| 9,026,325 B1 * | 5/2015 | Roettger | B60L 3/0061 |
| | | | 701/54 |
| 9,088,233 B2 | 7/2015 | Alcorn et al. | |
| 9,203,339 B2 | 12/2015 | Sato | |
| 9,214,884 B2 | 12/2015 | Sonoda et al. | |
| 9,291,876 B2 | 3/2016 | Cadugan et al. | |
| 9,843,285 B1 | 12/2017 | Lu | |
| 9,929,683 B2 | 3/2018 | Sonoda et al. | |

(Continued)

FOREIGN PATENT DOCUMENTS

| | | |
|---|---|---|
| CN | 101479928 | 7/2009 |
| CN | 101719751 | 6/2010 |

(Continued)

OTHER PUBLICATIONS

Random House Webster's College Dictionary, 373, 374 (2nd Random House ed. 1999).*

(Continued)

*Primary Examiner* — Eduardo Colon Santana
*Assistant Examiner* — Charles S Laughlin
(74) *Attorney, Agent, or Firm* — DALY, CROWLEY, MOFFORD & DURKEE, LLP

(57) ABSTRACT

A motor control system includes a motor; a motor and a motor control circuit coupled to the motor to provide power to the motor. The motor control circuit includes a power feedback loop having a power reference circuit to provide a reference power level and a power control circuit configured to provide a constant power level to the motor so that the motor operates with a substantially constant power output. The constant power level is proportional to the reference power level. Thus, the motor also provides substantially constant torque when the motor is at a constant speed.

14 Claims, 4 Drawing Sheets

(56) References Cited

U.S. PATENT DOCUMENTS

| | | | |
|---|---|---|---|
| 2003/0080701 A1* | 5/2003 | Kikuchi | H02P 9/305 318/140 |
| 2005/0067986 A1 | 3/2005 | Kurosawa et al. | |
| 2007/0159130 A1* | 7/2007 | Kaneko | H02P 21/22 318/806 |
| 2007/0182350 A1* | 8/2007 | Patterson | B60L 15/20 318/432 |
| 2013/0027997 A1 | 1/2013 | Tan et al. | |
| 2013/0342141 A1 | 12/2013 | Lawrence et al. | |
| 2014/0054103 A1* | 2/2014 | Kezobo | G01R 31/343 180/446 |
| 2016/0079902 A1 | 3/2016 | Hargis | |
| 2019/0127900 A1* | 5/2019 | Lee | D06F 33/47 |
| 2020/0021212 A1 | 1/2020 | Yamada et al. | |
| 2020/0028456 A1 | 1/2020 | Morioka et al. | |

FOREIGN PATENT DOCUMENTS

| | | |
|---|---|---|
| CN | 101938244 | 1/2011 |
| CN | 103066914 | 4/2013 |
| CN | 106655946 | 5/2017 |
| JP | H 03-032313 24 | 5/1991 |
| JP | 2003-134896 42 | 5/2003 |
| JP | 2006-211831 A | 8/2006 |

OTHER PUBLICATIONS

U.S. Appl. No. 15/967,841, filed May 1, 2018, Khosravi et al.
U.S. Appl. No. 13/595,430, filed Aug. 27, 2012, Ng.
PCT International Search Report and Written Opinion dated Feb. 21, 2020 for International Application No. PCT/US2019/063189; 13 Pages.
PCT International Preliminary Report dated Sep. 23, 2021 for International Application No. PCT/US2019/063189; 7 Pages.
Response to European Communication Pursuant to Rules 161/162 dated Aug. 6, 2021 for European Application No. 19824081.4; Response filed Dec. 16, 2021; 17 Pages.
Chinese Office Action with English Translation dated Jul. 18, 2023 for Chinese Application No. 201980092392.X; 17 pages.
Japanese Office action Jul. 4, 2023 with English translation for Japanese Application No. 2021-554563; 11 pages.

* cited by examiner

MOTOR CONTROLLER WITH POWER FEEDBACK LOOP

FIELD

This disclosure relates to motor control systems and circuits.

BACKGROUND

Circuits to precisely control, drive, and regulate brushless DC ("BLDC") electric motors are required in many applications. These circuits often create pulse-width modulated ("PWM") drive signals that are used to control power to the motor.

BLDC motors may include multiple coils. These coils, when energized, cause the motor to turn. However, for the motor to continuously turn, a motor controller circuit may have to energize one or more (but not all) of the coils at a time, energize the coils in a particular order, energize the coils in a forward and backward direction at different times, etc. The periods of time in which the coils are energized are often referred to as so-called "phases" of the motor. The coil (or coils) that are energized during a phase may be referred to as phase coils.

The sequence and timing of which coils are energized is dependent upon the design of the BLDC motor. As an example, one BLDC motor may have three coils that must be energized in sequence, i.e. a round-robin fashion, in order to turn the motor. Such a motor may have three "phases." In each phase, a different one or more of the three coils is energized. As the motor turns, the phase will change, and the motor driver will energize the next one or more coils in order to keep the motor spinning.

As each phase is energized, it physically drives the motor's rotor. The amount of power supplied to the coils may be directly proportional to the amount of torque produced by the motor. In many BLDC motors, the amount of power provided to the coils rises and falls over time as the coils are energized. As a result, the motor does not produce a constant torque output.

Various electric motor drive circuits are described in U.S. Pat. No. 7,590,334 (filed Aug. 8, 2007); U.S. Pat. No. 7,747,146 (filed Aug. 8, 2007), U.S. Pat. No. 8,729,841 (filed Oct. 12, 2011); U.S. patent application Ser. No. 13/595,430 (filed Aug. 27, 2012); U.S. Pat. No. 9,088,233 (filed Dec. 18, 2012); U.S. Pat. No. 9,291,876 (filed May 29, 2013); and U.S. patent application Ser. No. 15/967,841 (filed May 1, 2018), each of which is incorporated here by reference, and each of which is assigned to the assignee of this patent.

SUMMARY

In an embodiment, a system comprises: a motor; a motor and a control circuit coupled to the motor to provide power to the motor. The motor control circuit comprises a power reference circuit to provide a reference power level and a power control circuit configured to provide a constant power level to the motor so that the motor operates with a substantially constant torque at a substantially constant motor speed. The constant power level is proportional to the reference power level.

One or more of the following features may be included.
The motor control circuit may include a power feedback loop.

The power feedback loop may include a difference circuit that produces a signal representing a difference between the reference power level and a power level applied to the motor.

The power level applied to the motor may be calculated by multiplying a voltage and a current applied to the motor.

The power level applied to the motor may be calculated by multiplying an input voltage to a motor driver circuit with an input current to the motor driver circuit.

The system may include a circuit to measure the voltage applied to the motor.

The system may include a circuit to measure the current applied to the motor.

The signal may be provided as an input to the power input controller circuit.

The motor may have three phases.

The motor control circuit may include a speed feedback loop.

The speed feedback loop may include a difference circuit that produces a signal representing a difference between a reference speed value and a measured speed of the motor.

In another embodiment, a circuit comprises a motor driver circuit comprising a plurality of switches coupled to provide power to a motor and a motor control circuit. The motor control circuit comprises a power reference circuit to provide a reference power level and a motor control circuit configured to control the motor driver circuit to apply a constant power level to the motor so that the motor operates with a substantially constant torque at a substantially constant speed. The constant power level is proportional to the reference power level.

One or more of the following features may be included.
The motor control circuit may include a power feedback loop.

The power feedback loop may include a difference circuit that produces a signal representing a difference between the reference power level and a power level applied to the motor.

The power level applied to the motor may be calculated by multiplying a voltage and a current applied to the motor.

A circuit to measure the voltage applied to the motor may be included.

A circuit to measure the current applied to the motor may be included.

The signal may be provided as an input to the power input controller circuit.

The motor control circuit may include a speed feedback loop.

The speed feedback loop may include a difference circuit that produces a signal representing a difference between a reference speed value and a measured speed of the motor.

In another embodiment, a method of driving a motor with constant torque includes measuring a voltage applied to a motor, measuring a current applied to the motor, calculating an instantaneous power applied to the motor based on the measured voltage and current, determining a difference between the instantaneous power and a reference power level, and adjusting the voltage and/or the current applied to the motor so that the instantaneous power matches the reference power level.

In another embodiment, a system comprises: a motor and means for driving the motor to achieve a constant power so that a torque output of the motor is substantially constant.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

Figure 1:
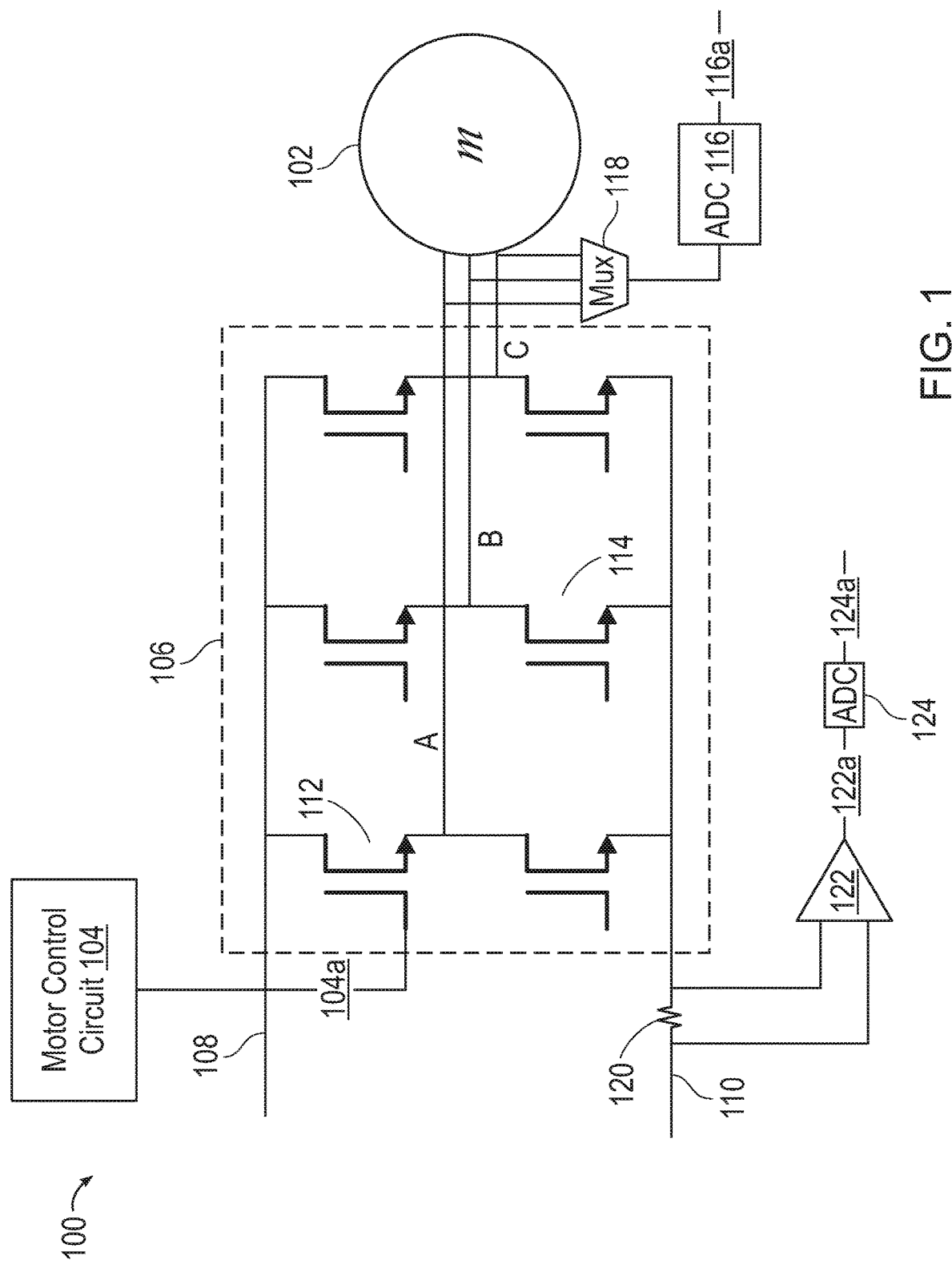
FIG. 1 is a block diagram of a system for controlling a motor.

FIG. 1 is a circuit diagram of a motor control system 100 for controlling motor 102. Motor control system 100 includes a motor control circuit 104 coupled to motor driver circuit 106. Motor driver circuit 106 is coupled to motor 102 and provides power to motor 102. In embodiments, motor control circuit may be a non-sinusoidal brushless DC motor control circuit.

In the example shown in FIG. 1, motor 102 is a three-phase motor. Accordingly, motor driver circuit 106 has six field effect transistor (FET) switches coupled in pairs between power line 108 and return line 110. The nodes between the pairs (i.e. nodes A, B, and C) are coupled to the coils of motor 102. As the FET switches open and close, they provide power to motor 102 and provide a return path from motor 102. For example, if FET switch 112 and FET switch 114 are closed (e.g. in a conducting state) while the other FET switches are open (e.g. in a non-conducting state), current may flow from power line 108, through FET switch 112 to node A, from node A through the internal coils of motor 102 to node B, and from node B through FET switch 114 to ground.

For ease of illustration, only the gate of FET switch 112 is shown coupled to motor control circuit 104. However, in embodiments, the gate of each FET switch within motor driver circuit 106 may be coupled to motor control circuit 104. Motor control circuit 104 may drive the gates of each FET switch with signal 104a to selectively open and close the FET switches. This effectively drives motor 102 by directing power to the coils of motor 102. One skilled in the art will recognize that, in other embodiments, the FET switches may be replaced by any device that can act as a switch such as a bipolar junction transistor ("BJT"), a relay, etc.

In embodiments, signal 104a may be a pulse width modulated ("PWM") signal. As the PWM on-time increases from zero to one hundred percent, the amount of current supplied to the motor increases proportionally from zero to its maximum value. Thus, motor control circuit 104 can control the amount of current supplied to motor 102 by altering the pulse width of signal 104a.

Motor control system 100 may include sensors to measure the voltage and current supplied to motor 102. As an example, to measure the voltage supplied to motor 102, analog-to-digital converter ("ADC") 116 may be coupled to nodes A, B, and/or C through multiplexor 118. ADC 116 may measure the voltage at the node that is supplying power to motor 102 and generate signal 116a representing the voltage supplied to motor 102. Multiplexor 118 may be controlled by motor control circuit 104 (or another control circuit) to connect the node (e.g. A, B, or C) that is currently providing power to motor 102 to ADC 116. In embodiments, a processor or circuit may receive signal 116a and use it to calculate an average or RMS value of the voltage supplied to motor 102.

As another example, to measure the current flowing through motor 102, motor control system 100 may include a shunt resistor 120 in the current path. The inputs of differential amplifier 122 may be coupled across shunt resistor 120. Thus, amplified signal 122a (i.e. the output of differential amplifier 122) may represent the voltage across shunt resistor 120. ADC 124 may convert amplified signal 122a into digital signal 124a, which may be used by motor control circuit 104 (or another circuit) to calculate the current flowing through motor 102. In embodiments, shunt resistor 120 may be According to Kirchhoff's current rule, the calculated current through shunt resistor 120 may represent the input current and/or the output current to motor 102.

Because the resistance of shunt resistor 120 is known, motor control circuit 104 may use the voltage across shunt resistor 120 to measure the current flowing through motor 102. Thus, digital signal 124a may also represent a measured current. In embodiments, the shunt resistor 120 may have a very small resistance so that it does not greatly impede the current flow and also does not dissipate a large amount of power. A typical value for shunt resistor 120 may be 0.1 Ohms or less. Also, although shunt resistor 120 is shown coupled to return line 110 to measure the current returning from motor 102 ($I_{out}$), shunt resistor could be coupled to power line 108 to measure the current flowing into motor 102 ($I_{in}$).

Figure 2:
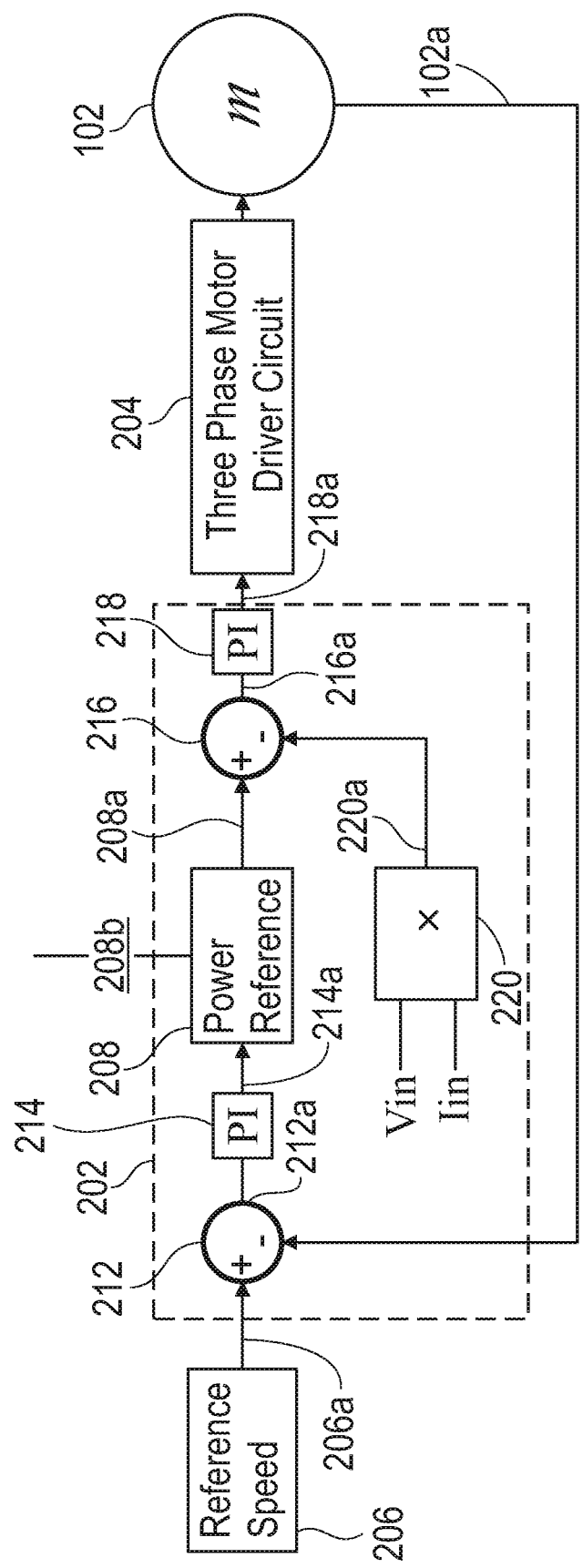
FIG. 2 is a block diagram of a system for controlling a motor.

Referring to FIG. 2, motor control system 200 includes a motor control circuit 202, which may be the same as or similar to motor control circuit 104. Motor control circuit 202 is coupled to motor driver circuit 204, which may be the same as or similar to motor driver circuit 106. Like motor driver circuit 106, motor driver circuit 204 may be coupled to motor 102 to provide power to motor 102.

Motor control circuit 202 may receive reference speed signal 206a, which represents a desired speed of motor 102, as an input from reference speed circuit 206. Reference speed circuit 206 may be any external circuit that can generate reference speed signal 206a to represent a desired speed of motor 102. In embodiments, reference speed circuit 206 may be an external control circuit, processor circuit, or the like. In other embodiments, reference speed signal 206a may be generated internally by motor control circuit 202.

Motor control circuit 202 may also include power reference circuit 208, which may generate power reference signal 208a. Power reference signal 208a may represent an amount of power to be applied to motor 102. In embodiments, power reference signal 208a may be a constant or variable signal and/or may be generated internally by power reference circuit 208. In other embodiments, power reference circuit 208 may receive an external power control signal 208b from an external source, which may represent a desired power level. In this case, power reference signal 208a may be proportional to or based on external power control signal 208b.

Reference speed signal 206a may be generated externally to motor control circuit 202. It can be fixed or change during operation to control the speed of motor 102. Power reference signal 208a may be calculated based on the error (e.g. difference) between reference speed signal 206a (e.g. the desired speed) and signal 102a (the actual speed). Signal 212a may represent the error between reference speed signal 206a and signal 102a. Power reference circuit 208 may then use the error to calculate power reference signal 208a.

For example, assume the reference speed signal 206a calls for 1000 rpm motor speed, and the measured speed 102a is 980 rpm. Signal 212a may represent the error (e.g. 20 rpm), which will be used by the PI loop circuit 208 to increase power reference signal 208a so that the motor accelerates to 1000 rpm at a predetermined power level.

Motor control system 200 may include two feedback loops: a speed feedback loop and a power feedback loop. The speed feedback loop may include difference circuit 212 and proportional integral ("PI") controller 214. Difference circuit 212 may receive reference speed signal 206a and back-electromotive force (EMF) signal 102a and generate difference signal 212a representing the difference or "error" between reference speed signal 206a and back-EMF signal 102a. Back-EMF may be a signal representing the back-EMF voltage of motor 102 or any other type of signal that can represent the speed of back 102.

PI controller circuit 214 may receive difference signal 212a and generate control signal 214a. In embodiments, control signal 214a may be a pulse-width modulated signal to control motor 102. For example, PI controller circuit 214 may increase the pulse width of control signal 214a to increase the speed of motor 102 and decrease the pulse width of control signal 214a to decrease the speed of motor 102. By doing so, PI controller circuit 214 can match the speed of motor 102 to the desired speed represented by reference speed signal 206a.

Although not shown, motor control system 100 may include signal shaping circuits such as amplifiers, filter, and the like, to condition back-EMF signal 102a before it is received by difference circuit 212.

The power feedback loop may include difference circuit 216, PI controller 218, and multiplier circuit 220. Multiplier circuit 220 may multiply a signal representing the voltage of motor 102 (e.g. signal 116a in FIG. 1) by a signal representing the current through motor 102 (e.g. digital signal 124a in FIG. 1). Power signal 220a of multiplier circuit 220 may represent the instantaneous power (e.g. the current power) applied to motor 102. In embodiments, multiplier circuit 220 may multiply the input voltage ($V_{in}$) to motor 102 by the input current ($I_{in}$) to motor 102 to generate power signal 220a, as shown in FIG. 1. In other embodiments, multiplier circuit 220 may multiply the output voltage ($V_{out}$) from motor 102 by the output current ($I_{out}$) from motor 102 to generate power signal 220a.

Difference circuit 216 may receive the current (e.g. instantaneous) power signal 220a and the desired power reference signal 208a and produce difference signal 216a, representing the difference or "error" between power signal 220a and power reference signal 208a. PI controller 218 may receive difference signal 216a and produce control signal 218a. Control signal 218a may be a pulse-width modulated signal to control motor 102. For example, PI controller 218 may increase the pulse width of control signal 218a to increase the power applied to motor 102 and decrease the pulse width of control signal 218a to decrease the power applied to motor 102. By doing so, PI controller 218 can match the power applied to motor 102 to the desired power represented by power reference signal 208a. In embodiments, control signal 218a may be the same as or similar to signal 104a. (See FIG. 1).

In embodiments, the power supplied to motor 102 may be proportional to power reference signal 218a. Proportional means that changes in the value of power reference signal 218a may result in changes to the power applied to motor 102. For example, if power reference signal 218a increases, the power applied to motor 102 may increase. In embodiments, power reference signal may have a constant value so that the power provided to motor 102 is a constant power level. In some cases, the power supplied to motor 102 may be a scalar multiple of the value of power reference signal 218a.

Figure 3:
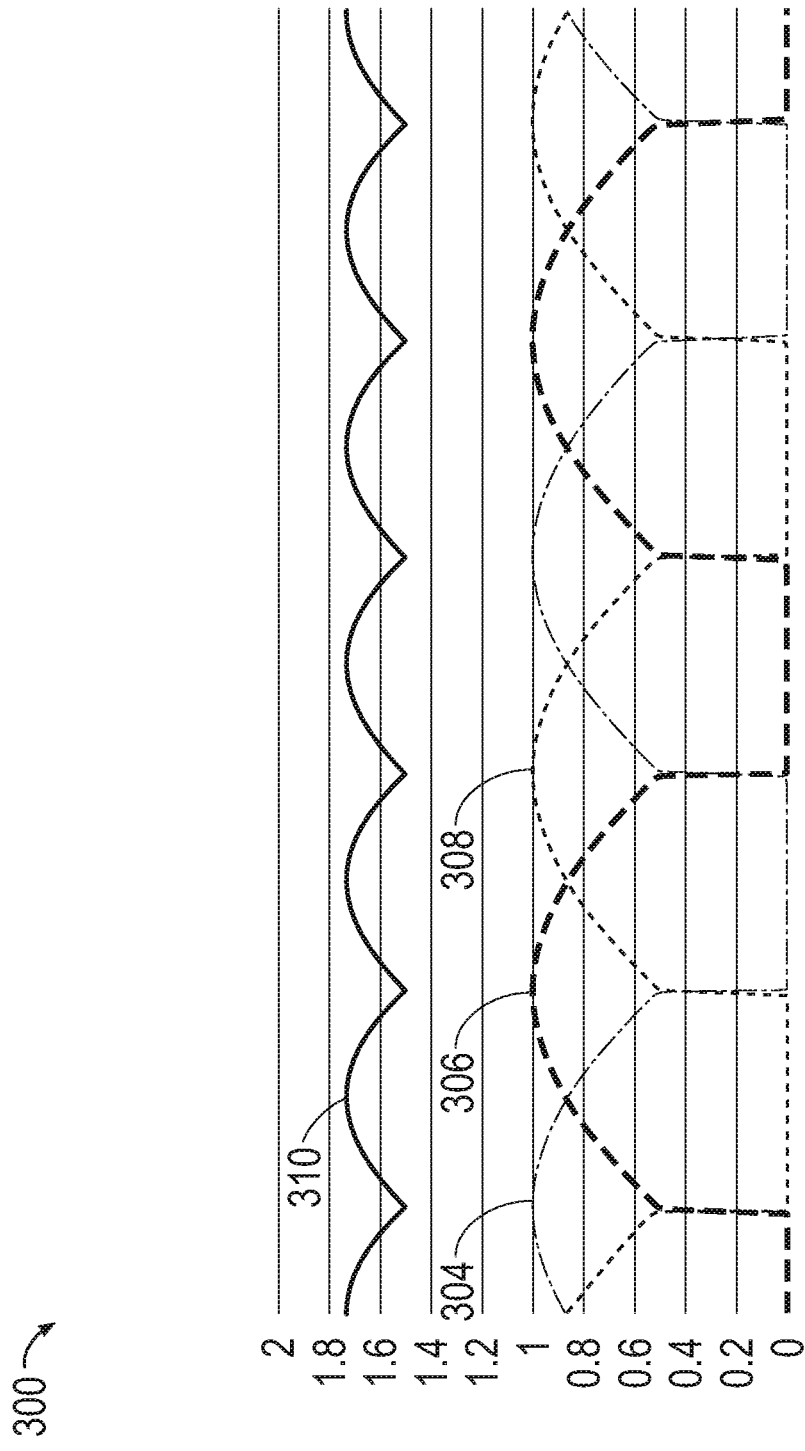
FIG. 3 is a graph of motor power for a motor driven by a motor control circuit of the prior art.

Referring to FIG. 3, graph 300 illustrates a motor power curve of the prior art. The horizontal axis represents arbitrary units of time and the vertical axis represents arbitrary units of power. Graph 300 illustrates the torque profile of a three-phase motor driven by a motor control circuit of the prior art.

The bottom waveforms 304, 306, and 308 each represent the output power of the motor when driven by one of the three motor phases. As each phase becomes active (e.g. as current is driven through the phase coil), the power increases to a peak, then drops off as the phase becomes inactive. Adding these three torque curves results in curve 310, which represents the overall output power of the motor for a three-phase motor of the prior art. As shown, the overall power curve is not constant; it peaks and falls in a function similar to the amplitude (or absolute value) of a sine wave over time. This may occur, for example, if the motor is driven by a non-sinusoidal brushless DC motor controller. Because motor power is the product of torque times motor speed, the motor's torque will not remain constant when the motor reaches a steady-state motor speed when drive by a power curve like curve 310.

Figure 4:
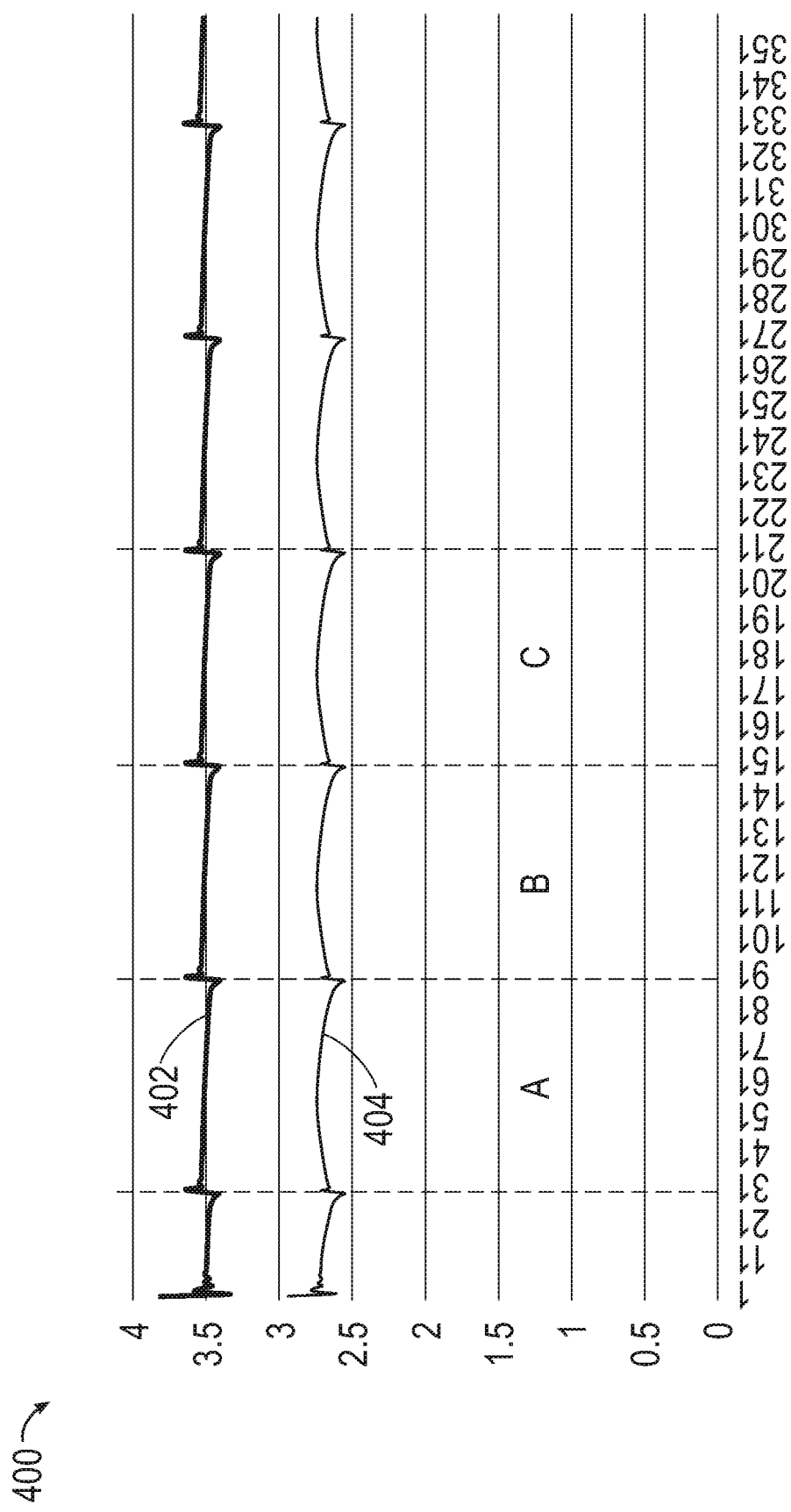
FIG. 4 is a graph of motor power for a motor driven by a motor control circuit that provides substantially constant torque output.

Referring to FIG. 4, graph 400 illustrates a power output curve of motor 102. The horizontal axis represents arbitrary units of time and the vertical axis represents arbitrary units of power. The waveforms are experimental results of motor input power and motor output power as the motor is controlled by motor control circuit 104 (or motor control circuit 202).

Waveform 402 represents the power input to motor 102, which may be calculated by multiplying the input voltage and current, as discussed above. Output power waveform 404 represents the output from motor 102. As shown, output power waveform 404 is relatively constant through all three motor phases A, B, and C and shows a reduced sinusoidal pattern. As a result, since torque is the quotient of power divided by motor speed, the motor's output torque is also constant for any constant motor speed.

Various embodiments are described in this patent. However, the scope of the patent should not be limited to the described embodiments, but rather should be limited only by the spirit and scope of the following claims. All references cited in this patent are incorporated by reference in their entirety.

The invention claimed is:

1. A system comprising:
   a motor; and
   a motor control circuit coupled to the motor to provide power to the motor, the motor control circuit comprising:
      a power reference circuit to provide a reference power level;
      a first difference circuit that produces a first difference signal being a difference between the reference power level and a power level applied to the motor;
      a power control circuit configured to receive the first difference signal and to provide a substantially constant power level to the motor so that the motor operates with a substantially constant torque at a substantially constant motor speed, wherein the constant power level is proportional to the reference power level; and a speed feedback loop comprising a second difference circuit that produces a second difference signal being a difference between a reference speed value and a back-electromotive force (EMF) signal, wherein the second difference signal is received at an input of the power reference circuit, wherein the back-EMF signal represents the back-EMF voltage of the motor, wherein the motor is directly coupled to the second difference circuit to provide the back-EMF signal directly to the second difference circuit.

2. The system of claim 1 wherein the power level applied to the motor is calculated by multiplying a voltage and current applied to the motor.

3. The system of claim 1 wherein the power level applied to the motor is calculated by multiplying an input voltage to a motor driver circuit with an input current to the motor driver circuit.

4. The system of claim 3 further comprising a circuit to measure the voltage applied to the motor.

5. The system of claim 3 further comprising a circuit to measure the input current applied to the motor.

6. The system of claim 1 wherein the motor has three phases.

7. The system of claim 1, wherein the power control circuit comprises a proportional integral (PI) controller.

8. The system of claim 1 wherein the second difference signal is used to control the power reference circuit to provide the reference power level.

9. A circuit comprising:
a motor driver circuit comprising a plurality of switches coupled to provide power to a motor; and
a motor control circuit comprising:

a power reference circuit to provide a reference power level;

a first difference circuit that produces a first difference signal being a difference between the reference power level and a power level applied to the motor; and a power control circuit configured to receive the first difference signal and to control the motor driver circuit to apply a constant power level to the motor so that the motor operates with a substantially constant torque, wherein the constant power level is proportional to the reference power level; and a speed feedback loop comprising a second difference circuit that produces a second difference signal being a difference between a reference speed value and a back-electromotive force (EMF) signal, wherein the second difference signal is received at an input of the power reference circuit, wherein the back-EMF signal represents the back-EMF voltage of the motor, wherein the motor is directly coupled to the second difference circuit to provide the back-EMF signal directly to the second difference circuit.

10. The circuit of claim 9 wherein the power level applied to the motor is calculated by multiplying a voltage and a current applied to the motor.

11. The circuit of claim 10 further comprising a circuit to measure the voltage applied to the motor.

12. The circuit of claim 10 further comprising a circuit to measure the current applied to the motor.

13. The circuit of claim 9 wherein the power control circuit comprises a proportional integral (PI) controller.

14. The circuit of claim 9 wherein the second difference signal is used to control the power reference circuit to provide the reference power level.

* * * * *